United States Patent [19]

Neefe

[11] 4,155,962
[45] May 22, 1979

[54] METHOD OF REMOVING MOLDED LENSES FROM THE MOLD

[75] Inventor: Charles W. Neefe, Big Spring, Tex.

[73] Assignee: Neefe Optical Laboratory, Inc., Big Spring, Tex.

[21] Appl. No.: 875,857

[22] Filed: Feb. 7, 1978

Related U.S. Application Data

[63] Continuation-in-part of Ser. No. 793,388, May 25, 1977, abandoned.

[51] Int. Cl.² .............................................. B29D 11/00
[52] U.S. Cl. ........................................ 264/1; 264/313; 264/334; 425/808
[58] Field of Search .......................... 264/1, 334, 313; 425/808

[56] References Cited

U.S. PATENT DOCUMENTS

| 1,378,064 | 5/1921 | Terranova | 264/313 |
|---|---|---|---|
| 3,353,220 | 11/1967 | Lenoble | 425/808 |
| 3,841,598 | 10/1974 | Grucza | 425/808 |
| 3,876,734 | 4/1975 | Howden | 264/1 |
| 3,931,373 | 1/1976 | Beattie | 264/1 |
| 4,027,845 | 6/1977 | Putzer | 264/313 |

FOREIGN PATENT DOCUMENTS 2518905  11/1975  Fed. Rep. of Germany .............. 264/1

Primary Examiner—James B. Lowe

[57] ABSTRACT

A method of making plastic lenses by casting a liquid monomer in a container having the required optical curve on the bottom of the container, polymerizing the monomer to form a solid having an optical surface formed within the container and cutting a second optical surface on the solid lens material with the container supporting the lens material during the cutting and polishing operation. Removing the lens from the casting container by applying force against the sides of the container to distort the container and stretching the surface to effect the release of the lens.

1 Claim, 4 Drawing Figures

METHOD OF REMOVING MOLDED LENSES FROM THE MOLD

FIELD OF THE INVENTION

The use of plastic materials for making optical lenses has increased rapidly for the past ten years. This is due to the availability of better plastic materials and the physical advantages of the plastic resins for specific application such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by the shrinkage of the monomer when polymerized, which often breaks the expensive molds.

The current lens molds are fabricated from steel or glass, each mold is individually ground and polished to the required specifications. To achieve accurate reproduction of the bifocal and lenticular molds is most difficult and expensive. This new process makes possible exact reproductions and has many other distinct advantages which will become apparent from the following disclosure.

An object is to provide a process for making inexpensive molds which may be made to identical specifications.

Another object is to provide a process where by standard masters may be used to produce a large quantity of replica molds.

THE LENSES ARE MADE AS FOLLOWS:

A master positive mold having the curvature required on the finished lens is made from glass, stainless steel or other materials which withstand the molding pressures and temperature. Materials which may be electroplated or plated by vacuum disposition have also been used.

DESCRIPTION OF THE PREFERRED EMBODIMENT

Figure 1:
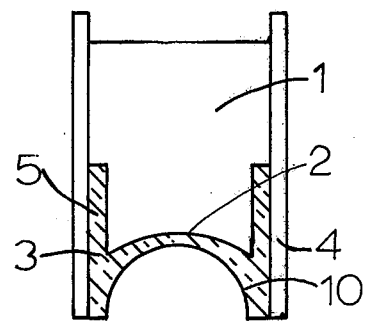
FIG. 1 shows the sleeve, steel mold and resinous material.
Figure 2:
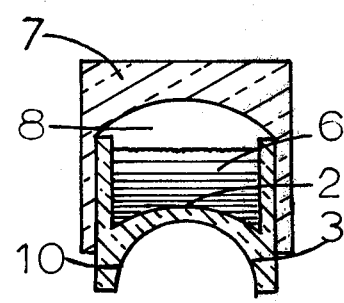
FIG. 2 shows the resinous mold containing the liquid monomers with cover.

The master mold 1 FIG. 1 is placed in a sleeve 4 FIG. 1, a molding grade of a resinous material such a polyimide, polycarbonate, polymethylpentene, polyethylene, polypropylene, nylon or other molding material is placed in the sleeve 4 FIG. 1. The sleeve and it's contents are heated to the softening point of the molding material and pressure is applied to form the lens mold 3 FIG. 1. The sides of the master mold 1 FIG. 1, have been cut to a smaller diameter to provide the opening 5 FIG. 1. When sufficient heat and pressure have been applied to molding compound 3 will fill the area around the positive mold 1 forming a cup-like cavity with a curved optical surface 2 FIG. 1, at the bottom. A concave opening 10 FIG. 1, is provided in the rear of the negative mold. This opening may be conical, cylindrical or spherical in shape to provide for the distortion of the mold shape when sufficient pressure is applied against the sides, 11 and 12 FIG. 4, to collapse the rear of the mold. The mold surface 2 FIG. 4, will be stretched releasing the lens. Either injection or compression molding may be used to produce cup 3 FIG. 2, after removal of the master mold 1 FIG. 1, a liquid or syrup monomer material containing a suitable catalyst 6 FIG. 2, is placed over the optical surface 2 FIG. 2, and covered to prevent evaporation with the cover 7 FIG. 2. The space 8 FIG. 2, is filled with nitrogen and the liquid monomer is polymerized to form a solid monolithic mass. Ultraviolet light, microwave energy or heat may be used to speed the polymerization process. Thermosetting and crosslinked hard materials may be used to produce lenses which are rigid and dimensionally stable and could not be made by injection or compression molding. This process is also suitable for the production of soft contact lenses which cannot be made by compression of injection molding techniques.

THE LENSES ARE MADE AS FOLLOWS

Figure 3:
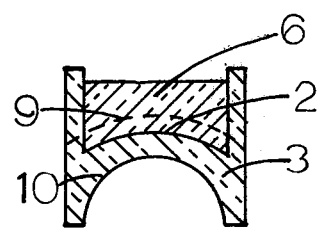
FIG. 3 shows the polymerized lens material with one optical surface molded on the resinous mold.

It is not necessary to remove the hardened plastic lens material 6 FIG. 3, from the mold 3 FIG. 3, before cutting the convex curve 9 FIG. 3. The mold 3 FIG. 3, may be placed in a suitable lathe and curvature 9 FIG. 3 cut and polished. The finished lens 6 FIG. 4, having the molded concave surface 2 and the convex curvature 9 which was cut and polished without being removed from the disposable mold 3 FIG. 4, which acted as the holding device during the cutting and polishing of curve 9 FIG. 4. The cup like device has served as a container for the monomer 6 FIG. 2, provided the molded optical surface which for contact lenses may be aspheric or may be composed of two or more spherical segments providing the required optical zone and peripheral curves. The cup like mold 3 FIG. 3, also serves as the holding block to facilitate cutting to the required thickness. The thickness of the cup bottom may be measured before adding the liquid monomers and measurements may be taken during the cutting operation and the lens thickness determined by subtracting the thickness of the cup bottom. The cup 3 FIG. 3, also serves as a holding fixture during the polishing operation. The lens is supported by the optical surface present on the mold, therefore the lens material must adhere strongly to the supporting mold in order to withstand the forces of cutting and polishing. This adhesion may be controlled by:

1. Selecting the material from which the lens mold is made.
2. By coating the lens mold with an adhesive.
3. By treating the mold surface with a solvent or release agent prior to adding the lens material.
4. By treating the mold material with a solvent or release agent before forming the material into a lens mold.

Figure 4:
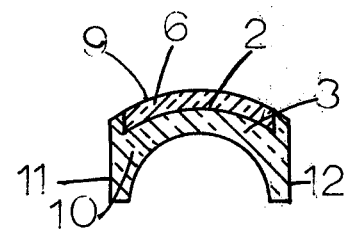
FIG. 4 shows the lens with the second optical surface cut and in the resinous mold.

After the lens is processed to the required specifications, the lens is removed by sharply flexing the holding fixture this is accomplished by applying pressure at points 11 and 12 FIG. 4, collapsing opening 10 FIG. 4, and stretching surface 2 FIG. 4. Separating the finished optical lens 6 FIG. 4, from it's support 3 FIG. 4.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of casting and removing from a resinous lens mold an optical lens of crosslinked polymeric material, said mold of resinous material having at one end a cup-like molding cavity with an optical surface and at the other end a collapsible opening comprising: casting a monomer in the liquid state in the molding cavity, polymerizing the monomer to form a rigid crosslinked solid having a first optical surface adhering to the optical surface of the mold with sufficient adhesive strength to allow cutting and polishing of a second optical surface, cutting and polishing the surface of the crosslinked solid on the side opposite the first optical surface to form a second optical surface while the crosslinked solid is held by the mold, and then removing the thus formed lens from the mold by collapsing the opening in the end of the mold opposite the end having the molding cavity by applying pressure against the sides of the opening to thereby distort the shape of the optical surface of the mold and stretch the mold material from the cast crosslinked polymeric lens to thereby release the lens from the mold.

* * * * *